United States Patent
Schou

[15] 3,674,868
[45] July 4, 1972

[54] CRYSTALLINE FUNGIMYCIN, A METHOD OF PREPARING SAME, COMPOSITIONS AND USE

[72] Inventor: Jorgen Martin Dohm Schou, Copenhagen, Denmark

[73] Assignee: Kefalas A/S, Copenhagen-Valby, Denmark

[22] Filed: May 28, 1969

[21] Appl. No.: 828,742

Related U.S. Application Data

[63] Continuation-in-part of Ser. No. 782,995, Dec. 11, 1968, abandoned.

[52] U.S. Cl. .............................................................424/122
[51] Int. Cl. ........................................................A61k 21/00
[58] Field of Search ..........................................424/115, 122

[56] References Cited

OTHER PUBLICATIONS

Borowski et al. Antimicrobial Agents Annual (1960) pages 532–538

*Primary Examiner*—Sam Rosen
*Attorney*—Gordon W. Hueschen and Hueschen & Kurlandsky

[57] ABSTRACT

Crystalline fungimycin, a process of purifying non-crystalline, amorphous fungimycin in order to obtain said crystalline material, compositions in oral dosage forms containing crystalline fungimycin and a method for the treatment of prostate hypertrophy in mammals with an effective dose of crystalline fungimycin.

8 Claims, 1 Drawing Figure

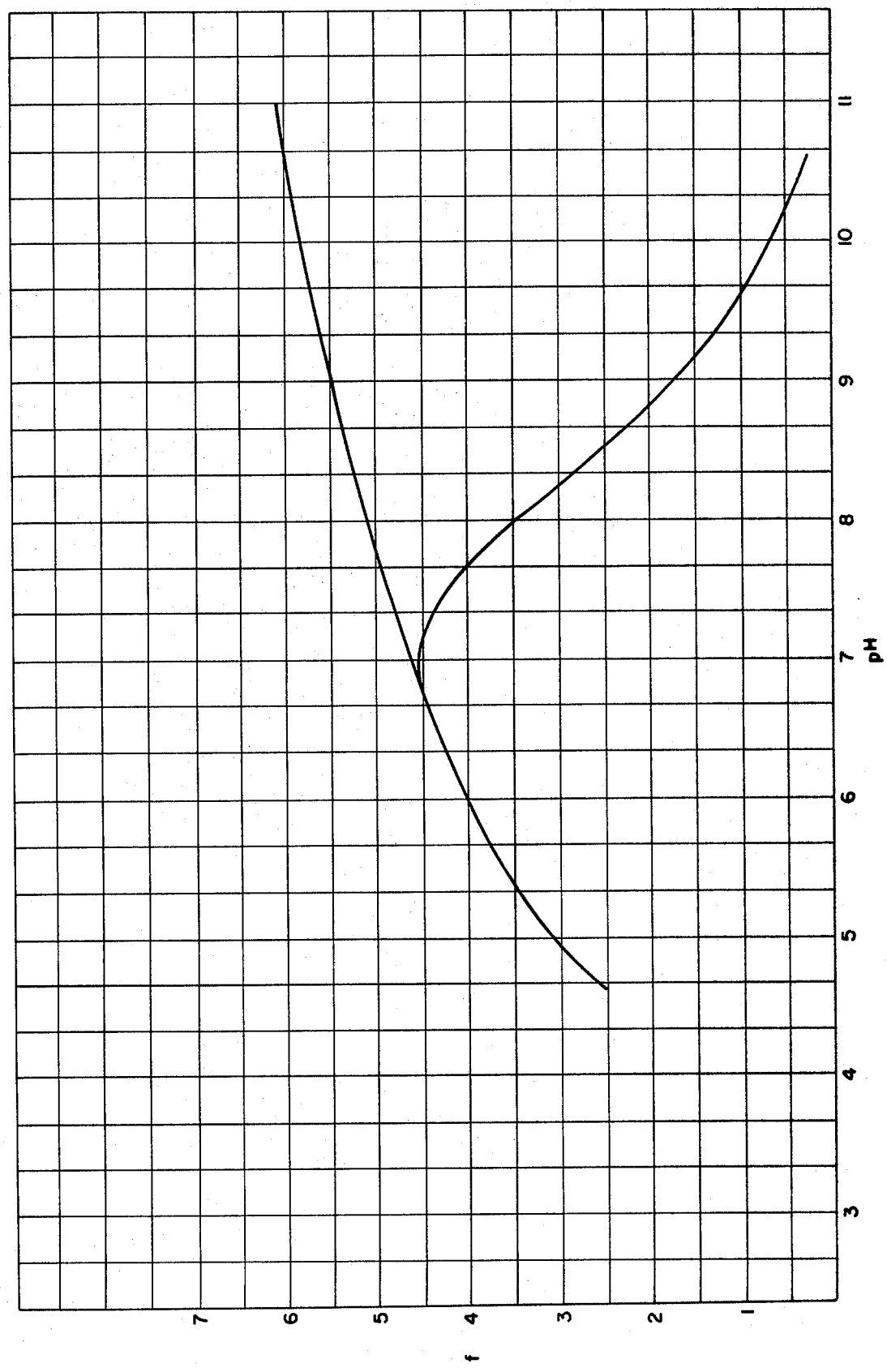

CRYSTALLINE FUNGIMYCIN, A METHOD OF PREPARING SAME, COMPOSITIONS AND USE

This application is a continuation-in-part of application Ser. No. 782,995 filed Dec. 11, 1968 and now abandoned.

This invention relates to crystalline fungimycin, a method of preparing crystalline fungimycin from non-crystalline fungimycin, a composition for oral use.

The heptaene antifungal antibiotic fungimycin (NC 1968, aminomycin, perimycin), produced by Streptomyces coelicolor var. aminophilus NRRL 2390, was isolated in crude form by Wooldridge and Hoffmann in 1952 and described in U.S. Pat No. 2,956,925. The crude antibiotic was reported as having promising in vitro antifungal activity. Methods for further purification have been developed and described in the literature such as Antimicrobial Agents Annual 1960, pg. 532-538, and Antimicrobial Agents and Chemotherapy 1963, p. 462-470. These methods did, however, only lead to amorphous non-crystalline materials.

Based upon repeated countercurrent-distributions previous workers within this field succeeded in preparing pure although still non-crYstalline fungimycin. Repeated precipitation from methanol yielded no crystalline material. The pure non-crystalline fungimycin exhibited an $E_{1cm}^{1\%}$ of 1,000 at 383 m$\mu$ in methanol.

Recently, attention has been focused on a hitherto un-noticed effect of polyenic antibiotics in the treatment of prostate hypertrophy in mammals, described in Pat. No. 67/2231 in the Union of South Africa. The effectiveness of the polyenic antibiotics was confirmed by tests on dogs, and especially the heptaene antifungal antibiotics such as candicidin caused a marked reduction of the size of the prostate gland and normal consistency of the gland.

It is stated in the South African patent that, in order to obtain the highest degree of effectiveness per given dose of active ingredient, it is necessary to use an enteric tablet or capsule because administration of the same dose in standard solid pharmaceutical formulations may result in a cleavage of any amino sugar present, or of other groups similarly sensitive to gastric conditions, thereby dimishing the effectiveness of the active ingredient.

As most heptaenic antibiotics, and especially fungimycin, hitherto have been available only as amorphous non-crystalline compounds which are rapidly inactivated in the gastric juice, the necessity of enteric coating is evident. In order to avoid the costly coating and further obtain a desired mixing with the content of the stomach before entering the intestines, it would certainly be desirable to have an acid-stable modification. The hitherto unknown crystalline fungimycin and the compositions of the present invention make possible a treatment of prostate hypertrophy in mammals whereby previous drawbacks are avoided.

Starting from the less stable non-crystalline form of fungimycin, the method of the invention broadly comprises the steps of (1) extracting a partially watermiscible polar organic solvent solution of non-crystalline fungimycin with an aqueous borate solution at an alkaline pH to form a borate complex of fungimycin in the aqueous phase, (2) dissociating the borate complex of fungimycin and extracting the fungimycin from the aqueous phase with a partially watermiscible polar organic solvent, (3) isolating the purified fungimycin from said solvent, (4) crystallizing the fungimycin from polar organic solvent, and (5) isolating the crystalline fungimycin.

A polar organic solvent employed is preferably lower aliphatic alcohols, especially a butanol, such as 2-butanol, or amylalcohols and further ketones such as methylethylketone. Also mixtures of such solvents may be used with success. In its broadest content, the solvent must only be one which dissolves the fungimycin and is partially miscible with water. The borate solution acts as a buffer and the pH of the solution is preferably in the range of about 9.5 to about 10.5, and the complex may possibly take the shape of an acid ester formed with adjacent hydroxyl groups present in the fungimycin molecule, although the exact mechanism has not been determined and is presently not understood.

FIG. 1 illustrates the ratio of distribution of fungimycin in the system methylethylketone : water at various values of pH.

Starting at a pH of about 4.75 the distribution will be the same up to a pH of about 6.8 whether or not a borate is present. From then on the upper curve illustrates the distribution when borate is absent, whereas the lower curve illustrates the distribution when borate is present. The very striking difference makes it likely to believe that the difference comes from the formation of a borate complex in the last case.

The dissociation of the borate complex may be accomplished by acidifying the aqueous solution, preferably with a weak acid, such as acetic acid or phosphoric acid to a pH at which the fungimycin still is stable, preferably to a pH of about 6 – 6.5.

The isolation of the purified fungimycin from the solvent may according to the invention preferably be carried out by evaporation of the solution to dryness or to a small volume and then adding a non-polar organic solvent in which the fungimycin is practically insoluble such as petroleum ether, diethyl ether, or the like.

As organic solvent for the crystallization of the purified fungimycin may be used methanol, ethanol, propanol, butanol, methylethylketone, or the like, preferably containing some water too. Mixtures of such solvents may be used as well.

The process of purifying fungimycin according to the invention is particularly described in the following example which must not be construed as limiting.

EXAMPLE 1

The solution of crude non-crystalline fungimycin, obtained essentially as described in U.S. Pat. No. 2,956,925, used as starting material was obtained as follows:

3,950 litres of fermented broth, containing 0.12 g fungimycin/litre is adjusted from its original pH (ca. 8) to 5.5 by using 50 percent aqueous acetic acid and subjected to counter-current extraction on a centrifuge in two steps using 1,100 liters of 1-butanol and then washing in 3 steps in counter-current on a centrifuge using 500 litres 0.02 m. carbonate buffer at pH 10.2. The extracted broth and carbonate-buffer is discarded, while the butanol-extract (1,260 litres) is transferred to an aqueous concentrate by azeotropic evaporation of the butanol during addition of water under cacuum (10 –20 mm Hg).

The resulting aqueous concentrate (210 l) is adjusted to pH 10.2 with $Na_2CO_3$-solution and stirred for half an hour with 97 litres of MEK (methylethylketone) and put aside for settling for some time. Afterwards, the rinsed concentrate (260 l) is drained off, while the greater part of the impurities are left in the light yellow upper-layer, which is discarded.

The rinsed concentrate is now extracted four times by using 90 litres MEK, the last lower-layer is discarded while the four pooled MEK-extracts (388 l) are washed twice with 90 litres 0.02 m. carbonate-buffer at pH 10.2 ; the washwater is discarded and the ketone-phase used as starting material. The ketone-phase (285litres) is then extracted four times using 79 litres 0.02 m borax pH 10.2 , the extracts pooled and the MEK-layer (169l) discarded.

The pooled borate-phases (290 l) are then washed twice using 60 litres MEK, which is discarded. The pH in the borate-phase is then adjusted to 6–5 by using 10 percent aqueous acetic acid and extracted twice with 55 litres of 1-butanol, which is then pooled, while the water-layer is discarded.

The butanol-phase (255 l) is washed with 115 litres of water, which is separated and discarded, while the butanol-phase is evaporated under vacuum (10 – 29 mm Hg) until 17 litres dry butanol-solution remain. This solution is poured into 51 lites of petroleum-ether (80°– 110° C) under agitation, which results in the precipitation of purified noncrystalline fungimycin. The precipitate is filtered off, rinsed with petroleum-ether and dryed in vacuum (40 – 60 mm Hg) for 2 days at 35°– 40° C.

Yield:

291 g purified non-crystalline fungimycin, $E_{1cm}^{1\%}$ (379 $\mu$m) = 875 "as it is," 3.2 percent volatiles ~253 g 100 percent fungimycin.
Yield from fermented broth:
51.7 percent 100 g fungimycin ($E_{1cm}^{1\%}$ (379 $\mu$m) is quickly (<2 mins.) put into 1,000 milliliters of boiling 90percent-$H_2O$ -saturated-MEK while stirring vigorously. When all the substance has been added, the crystallization has begun and the vessel is put aside for normal cooling under agitation for 3 hours, the crystalline material is filtered off on to a sintered glass disc having a pore diameter of G3, washed with water-saturated-MEK and then MEK alone. Afterwards the cake is dryed over $P_2O_5$ for 20 hours at <5 mm Hg.
Yield:

68.5 g crystalline fungimycin, $E_{1cm}^{1\%}$ (379 $\mu$m) = 926~72.4 percent of the non-crystalline substance, 37.4 percent of the fungimycin content in the fermented broth.

The same result is obtained using 2-butanol, iso-butanol and tertiary amylalcohol as partially water miscible polar organic solvents for the partition.

By repeated recrystallizations from MEK containing some water crystalline fungimycin showing a constant extinction, $E_{1cm}^{1\%}$ (379 $\mu$m) = 1,000, was obtained. This extinction did not change upon further recrystallizations.

The crystalline fungimycin obtained according to Example 1 takes the form of very small yellow crystals not visible by optical microscopy. The crystals have no sharp melting point and decompose according to the method of heating over a temperature range of about 200° to about 250° C.

Now that a crystalline fungimycin has been provided by the method of the present invention a further extension of the invention results in comparative easy crystallization of fungimycin from super-saturated solutions of more or less pure non-crystalline fungimycin. Once crystals of fungimycin have been obtained a spontaneous crystallization of fungimycin from supersaturated solutions of non-crystalline fungimycin in organic polar solvents, preferably containing some water, either by seeding from the air or by adding a few crystals to the solution. Such methods fall within the scope of the present invention.

The crystalline fungimycin is generally more insoluble than the non-crystalline modification as will appear from the following data:
Determination of Solubility of Crystalline and Non-crystalline Fungimycin in Different Solvents.
Method:

200 mg 100 percent fungimycin is equilibrated with 4.00 ml solvent at 24° C by shaking in a test tube for 15 min. followed by centrifuging the insolubilized residue, and measuring the extinction at 379 $\mu$m in the supernatant liquid. From the extinction the solubility is derived by assuming $E_{1cm}^{1\%}$ (379 $\mu$m) = 1,000. Some of the solubility values of the non-crystalline fungimycin are too low due to partial crystallization during the equilibration time, which occurred after the first crystalline fungimycin has been prepared.

| solvent | Solubility of fungimycin % w/v | | solubility of crystalline solubility of amorphous |
|---|---|---|---|
| | crystalline | non-crystalline | |
| $H_2O$ | <0.01 | <0.01 | — |
| MeOH | 3.0 | >4.0 | <0.8 |
| EtOH | 0.5 | 1.8 | 0.3 |
| 96% EtOH | 0.6 | 2.2 | 0.3 |
| $\eta$-BuOH | 0.1 | 1.0 | 0.1 |
| $H_2O$-sat.-$\eta$BuOH | 1.0 | >2.0 | <0.5 |
| Acetone | 0.4 | 1.2 | 0.3 |
| MEK | 0.15 | 0.8 | 0.2 |
| $H_2O$-sat.-MEK | 0.6 | >1.8 | <0.3 |
| MEK-sat.-$H_2O$ | 1.0 | 2.0 | <0.5 |

The crystalline fungimycin is moreover considerably more stable in gastric juice at 37° C as compared with the non-crystalline material which is inactivated to a degree of about 50 percent in about 2 hours, whereas the crystalline fungimycin is not inactivated to the same degree in about 8 hours.

The crystals show a definite X-ray diffraction pattern indicative of an organized crystalline structure. The crystals are so small that they may be characterized as crypto crystals which are not ordinarily visible by optical microscopy,
Index of refraction:
$n^D = 1.629 \pm 0.002$.

The crystalline fungimycin exhibits an $E_{1cm}^{1\%}$ of about 1,000 at 379 m$\mu$in methanol, which remained constant upon further recrystallizations from methylethylketone-water.

The compositions of the invention take the form of preparations for oral administration such as tablets, capsules, or powders, and the crystalline fungimycin shows preferably an extinction $_{1cm}^{1\%}$ of from about 900 to about 1,000 at 379 m$\mu$.

Most conveniently, the crystalline fungimycin is administered orally in unit dosage form such as tablets or capsules, each dosage unit containing the crystalline fungimycin in an amount of from about 1 to about 100 mg, most preferably, however, from about 5 to 50 mg, the total daily dosage usually ranging from about 0.1 mg to 50 mg active ingredient per kg of body weight per day and preferably from 0.5 mg to 20 mg per kg of body weight per day.

A composition taking the form of capsules, each containing 20 mg of crystalline fungimycin, may be as follows:
One hard gelatine capsule contains:

| Crystalline fungimycin | 20 mg |
|---|---|
| Lactose | q.s. |
| Magnesium stearate 1.5 mg | |

A tablet containing 25 mg of crystalline fungimycin may have the following composition:

| Crystalline fungimycin | 25 mg |
|---|---|
| Lactose | 20 mg |
| Corn starch | 40 mg |
| Gelatine | 1 mg |
| Talc | 6 mg |

A tablet containing 50 mg of crystalline fungimycin may have the following composition:

| Crystalline fungimycin | 50 mg |
|---|---|
| Corn starch | 45 mg |
| Lactose | 16 mg |
| Polyvinyl pyrrolidone | 2 mg |
| Sorbitol | 6 mg |
| Talc | 9 mg |
| Magnesium stearate | 0.6 mg |
| Gelatine | 2 mg |

A tablet containing 20 mg of crystalline fungimycin is as follows:

| Crystalline fungimycin | 20 mg |
|---|---|
| Potato starch | 10 mg |
| Lactose | 30 mg |
| Calcium phosphate | 20 mg |
| Polyvinyl pyrrolidone | 2 mg |
| Gelatine | 2 mg |
| Talc | 2 mg |
| Magnesium stearate | 0.5 mg |

The exact individual dosage as well as daily dosages in a particular case will, of course, be determined according to established medical principles under the direction of a physician or a veterinarian.

I claim:

1. Crystalline fungimycin, having the form of a crypto crystalline powder having no sharp melting point but a decomposition range of about 200°–250° C, being generally more insoluble in certain organic solvents than the amorphous form of fungimycin as shown in the Table herein, and being characterized by considerably increased stability in gastric juice when compared with the amorphous form of fungimycin, crystals of the said crystalline fungimycin (a) exhibiting an $E_{1cm}^{1\%}$ of about 1,000 at 379 m$\mu$ in methanol which remains constant upon further recrystallization from methylethylketone-water, and (b) showing an X-ray diffraction pattern. Index of refraction:

$n^D = 1.629 \pm 0.002$.

2. A process of preparing crystalline fungimycin, as defined in claim 1, from a less stable non-crystalline form of fungimycin, which comprises the steps of (1) extracting a partially watermiscible polar organic solvent solution of non-crystalline fungimycin with an aqueous borate solution at an alkaline pH of about 9.5 to 10.5 to form a borate complex of fungimycin in the aqueous phase, (2) dissociating the borate complex of fungimycin by downward pH adjustment and extracting the fungimycin from the aqueous phase with a partially watermiscible polar organic solvent therefor, (3) isolating the purified fungimycin by separation from said solvent, (4) crystallizing the fungimycin from a polar organic solvent, and (5) separating the crystalline fungimycin.

3. Process of claim 2, comprising dissociating the borate complex of fungimycin by downwardly adjusting the pH to about 6 – 6.5.

4. A pharmaceutical composition in oral dosage form suitable for use in the oral treatment of prostate hypertrophy comprising an orally effective amount of crystalline fungimycin, as defined in claim 1, together with a pharmaceutically acceptable carrier therefor.

5. Composition of claim 4, wherein the fungimycin is present in amount of at least about 5 mg.

6. A borate complex of fungimycin exhibiting preferential partition into the water phase of a two-phase system consisting of (1) methylethyl ketone and (2) water at pH about 9.5 – 10.5, prepared by mixing an aqueous borate solution at an alkaline pH of about 9.5 – 10.5 and a polar partially water-miscible organic solvent solution of non-crystalline fungimycin.

7. A composition comprising (1) a borate complex of fungimycin of claim 6 (2) a polar, partially watermiscible organic solvent, and (3) water at a pH about 9.5–10.5

8. A process of preparing a composition as defined in claim 6, which comprises extracting a partially watermiscible polar organic solvent solution of fungimycin with an aqueous borate solution at an alkaline pH of 9.5 to 10.5 to form a borate complex of fungimycin in the aqueous phase and separating said aqueous phase from the organic phase.

* * * * *